(No Model.)
J. S. COPELAND.
WHEEL HUB.
No. 491,937. Patented Feb. 14, 1893.
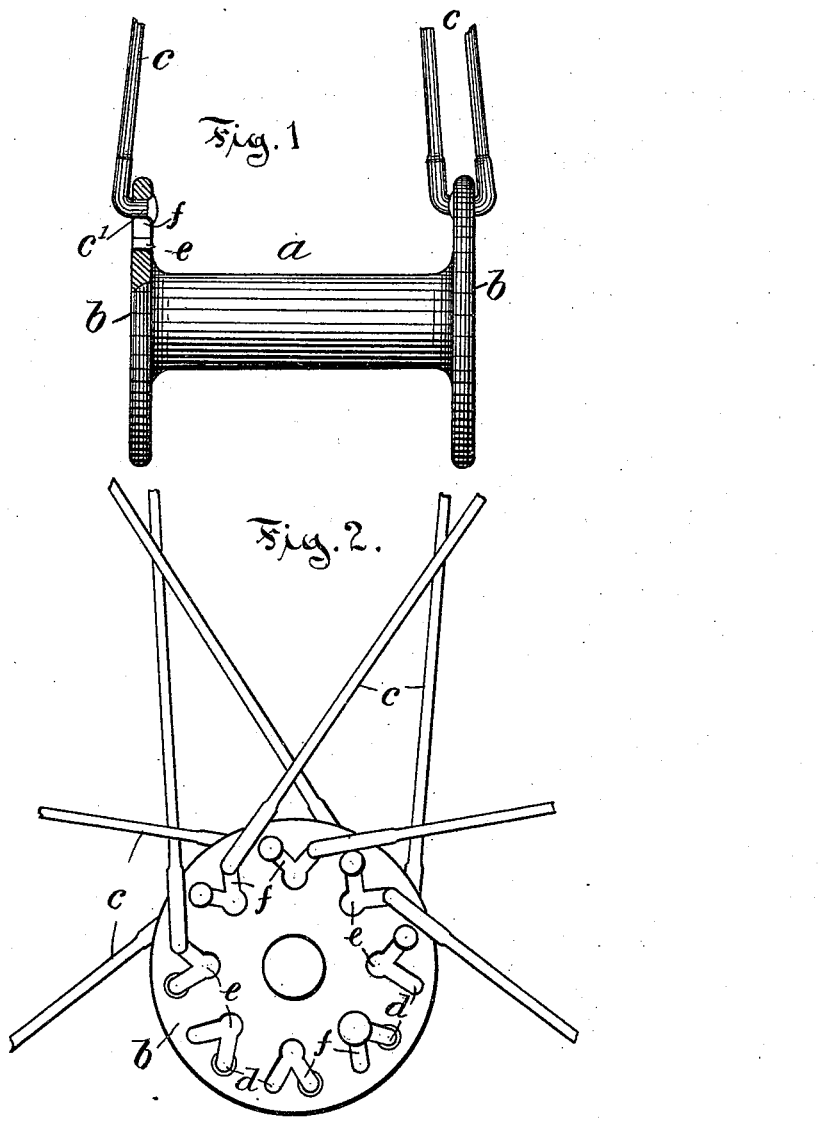

UNITED STATES PATENT OFFICE.

JAMES S. COPELAND, OF HARTFORD, CONNECTICUT, ASSIGNOR TO THE POPE MANUFACTURING COMPANY, OF BOSTON, MASSACHUSETTS.

WHEEL-HUB.

SPECIFICATION forming part of Letters Patent No. 491,937, dated February 14, 1893.

Application filed November 21, 1892. Serial No. 452,644. (No model.)

*To all whom it may concern:*

Be it known that I, JAMES S. COPELAND, of Hartford, in the county of Hartford and State of Connecticut, have invented certain new and useful Improvements in Hubs for Wheels, of which the following is a full, clear, and exact description, whereby any one skilled in the art can make and use the same.

The object of my invention is to provide an improved means of removably securing the spokes to the hub of a wheel particularly in the type known as suspension wheels such as are commonly used in bicycles and like vehicles.

To this end my invention consists more particularly in the combination of the parts by means of which the inner end of each spoke is secured to the hub as more particularly hereinafter described and pointed out in the claims.

Referring to the drawings:—Figure 1 is a detail view of a wheel hub with part of one of the flanges cut away. Fig. 2 is a detail view in side elevation of the hub.

In the accompanying drawings the letter $a$ denotes the hub of a wheel that is usually made of metal and has a flange $b$. The felly or rim of the wheel is secured to the hub by means of spokes $c$ that are secured at their opposite ends to these respective parts and are usually under tension.

In the flange of the hub there is arranged a series of holes $d$, $e$, with half as many holes in the inner circle as in the outer. Each of the holes in the inner circle is connected by a slot $f$ with two of the holes in the outer range of holes, the latter form the true sockets in which the hooked end $c'$ of each of the spokes is seated. The inner hole $e$ is preferably larger in diameter than the outer so as to allow the end of the spoke to be passed through it. The spoke is turned when the hooked end $c'$ is reached and the neck at the bend and just back of the head that is formed on the end of the spoke is slipped through until the socket $d$ is reached, and the spoke is then swung into the proper line to enable the outer end to be secured to the rim by any convenient fastening means, usually a nipple that has a threaded socket fitting the threaded outer end of the spoke. The neck of the spoke may be made wider in the direction of the length of the spoke than the transverse diameter, the object of such an arrangement being to enable the spoke to be locked into place in the outer socket by sliding the neck along the slot $f$ that is but slightly wider than the narrowest diameter of the neck, and then turning the spoke so that its greater diameter is presented sidewise to the slot.

As another means of preventing the accidental removal of the inner end of the spoke from the socket a plug $g$ may be inserted in the hole $e$. This plug may consist of a screw threaded to fit the threaded socket and fastened in place after the spokes have been all attached to the hub.

A material advantage of this improved method of securing the spokes to the hub is due to the fact that a flange is not so liable to be weakened by the cutting away of the material to form the key-hole slots when they are grouped in pairs radiating from a central inner socket as when they are formed separately and extend radially of the flange; and another advantage resides in the arrangement that secures the head of the spoke in place by providing a neck that is oblong in cross section and has the width of the slot less than the greater diameter of the neck.

I claim as my invention—

1. In combination in a wheel a flanged hub, the spoke sockets with two or more of the outer row connected by a slot to an inner opening common to the several slots and larger in diameter than the outer sockets, all substantially as described.

2. In combination in a wheel a flanged hub, the flange having a series of spoke sockets two or more of the outer row united to an inner opening by a narrow slot, a spoke having the bent and headed inner end with a neck oblong in cross section and having its larger diameter greater than the width of the slot, all substantially as described.

3. In combination with the flange of a wheel, a series of spoke sockets two or more of the outer row being connected by narrower slots with a single one of an inner row of openings, a spoke having a bent and headed inner end adapted to be held within the spoke socket and a plug secured in each of the inner row of holes, all substantially as described.

JAMES S. COPELAND.

Witnesses:
ARTHUR B. JENKINS,
CHAS. L. BURDETT.